US007923856B2

(12) United States Patent  
Bertrand et al.

(10) Patent No.: US 7,923,856 B2
(45) Date of Patent: Apr. 12, 2011

(54) LOW VOLTAGE CONTROL INTERFACE COUPLER FOR MULTIPULSE TRANSMITTER

(75) Inventors: Paul Bertrand, Pierrefeu du Var (FR); Michel Gaeta, La Valette du Var (FR); Franck Hieramente, Sollies-Ville (FR)

(73) Assignee: Watteco, La Garde (FR)

( * ) Notice: Subject to any disclaimer, the term of this patent is extended or adjusted under 35 U.S.C. 154(b) by 114 days.

(21) Appl. No.: 12/185,312

(22) Filed: Aug. 4, 2008

(65) Prior Publication Data

US 2009/0236907 A1  Sep. 24, 2009

(30) Foreign Application Priority Data

Mar. 20, 2008  (FR) .................................... 08 01520

(51) Int. Cl.  
*H04B 3/58* (2006.01)  
*H02J 3/18* (2006.01)

(52) U.S. Cl. ............ 307/3; 307/116; 307/130; 307/139; 307/140

(58) Field of Classification Search .............. 307/3, 116, 307/130, 139–140  
See application file for complete search history.

(56) References Cited

U.S. PATENT DOCUMENTS

| 5,691,691 | A | 11/1997 | Merwin et al. | |
|---|---|---|---|---|
| 5,717,685 | A * | 2/1998 | Abraham | 370/276 |
| 6,529,000 | B2 * | 3/2003 | Lou | 324/309 |
| 6,694,439 | B2 * | 2/2004 | Cho et al. | 713/300 |
| 7,078,982 | B2 * | 7/2006 | Bertrand | 332/106 |
| 7,224,272 | B2 * | 5/2007 | White et al. | 340/538 |
| 7,308,103 | B2 * | 12/2007 | Corcoran et al. | 380/266 |
| 7,558,206 | B2 * | 7/2009 | Berkman et al. | 370/236 |
| 2006/0076830 | A1 * | 4/2006 | Hair et al. | 307/1 |
| 2006/0097572 | A1 * | 5/2006 | Drouin et al. | 307/1 |
| 2008/0106241 | A1 * | 5/2008 | Deaver et al. | 323/209 |
| 2008/0258551 | A1 * | 10/2008 | Chitta et al. | 307/3 |

FOREIGN PATENT DOCUMENTS

| EP | 1136829 A1 | 9/2001 |
|---|---|---|
| EP | 0 645 870 B1 | 5/2002 |
| WO | 2006/008381 A1 | 1/2006 |
| WO | 2006/113945 A1 | 10/2006 |

OTHER PUBLICATIONS

French Search Report for the related French Application No. 0801520 dated Nov. 7, 2008.  
International Search Report and Written Opinion for the related International Application No. PCT/FR2009/000281.

* cited by examiner

*Primary Examiner* — Jared J Fureman  
*Assistant Examiner* — Adi Amrany  
(74) *Attorney, Agent, or Firm* — Panitch Schwarze Belisario & Nadel LLP

(57) ABSTRACT

A method for causing, in a power distribution network, an oscillation allowing data to be transmitted, includes connecting at least one capacitive load in series with a modulation circuit between two wires of the network. The amplitude modulation circuit includes at least one Zener diode and at least one switch. A short make pulse is applied to the switch such that it is conductive and short-circuits the Zener diode by modulating the amplitude of the network voltage. The duration of the make pulse is such that the amplitude modulation of the network voltage causes a response of the network in the form of a high-frequency oscillation of the network voltage.

20 Claims, 9 Drawing Sheets

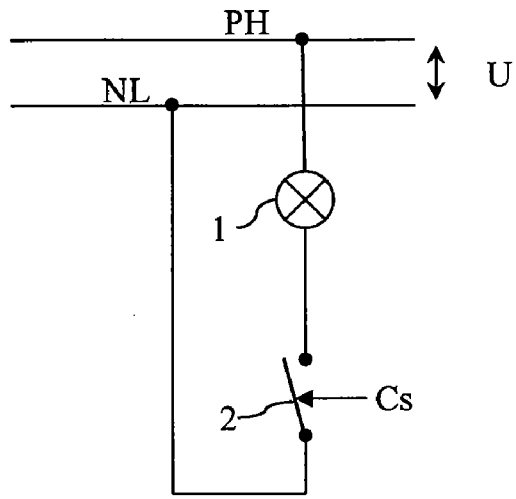
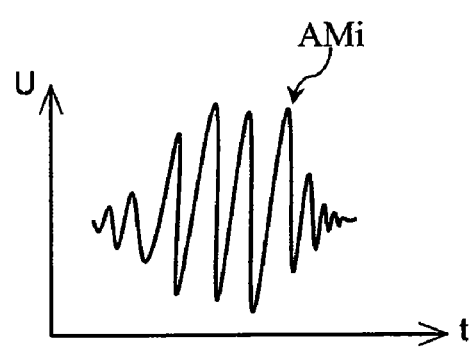
Fig. 1A
Prior Art
Fig. 1B
Prior Art
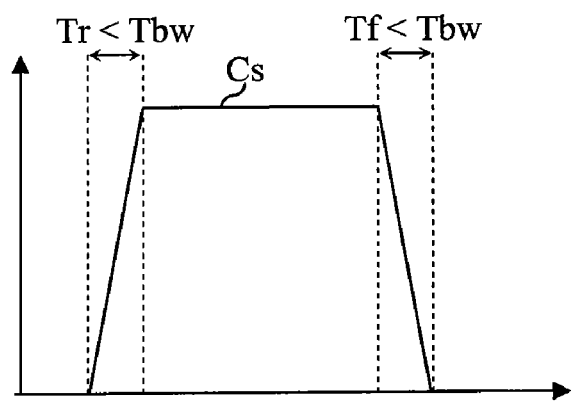
Fig. 2
Prior Art

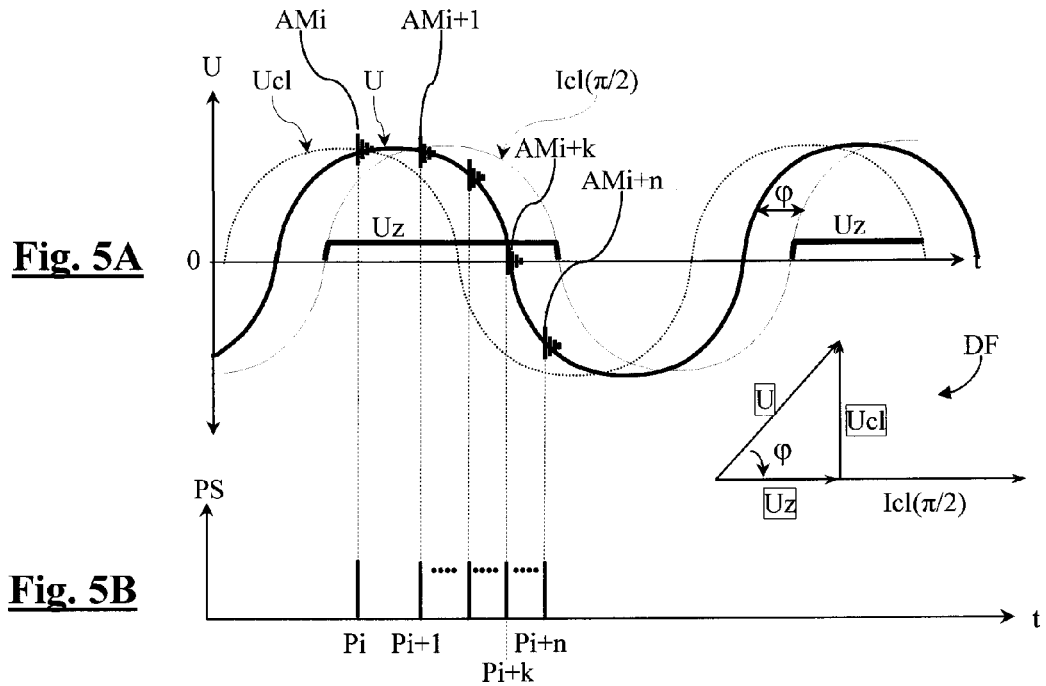
Fig. 5A
Fig. 5B
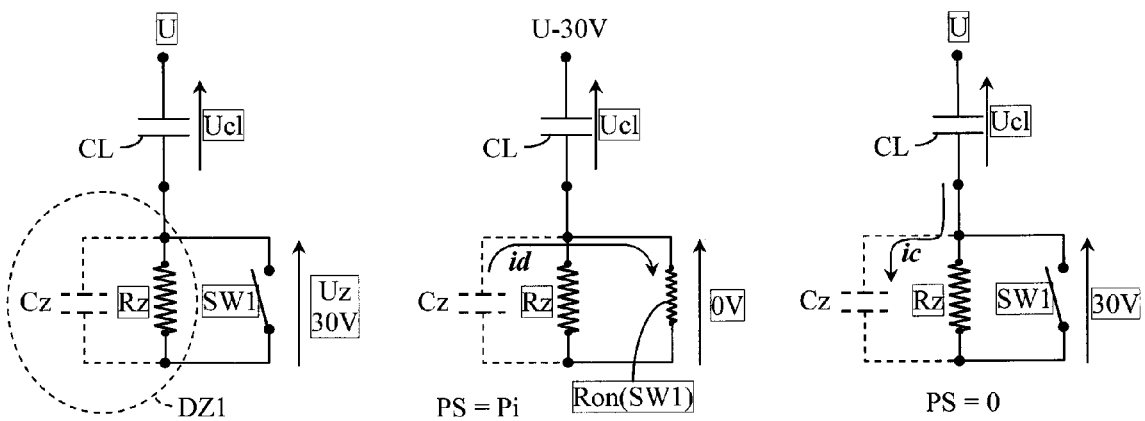
Fig. 6A  Fig. 6B  Fig. 6C

US 7,923,856 B2

LOW VOLTAGE CONTROL INTERFACE COUPLER FOR MULTIPULSE TRANSMITTER

BACKGROUND OF THE INVENTION

Embodiments of the present invention relate to a method for generating a signal in a power distribution network, in particular to transmit data.

Further embodiments of the present invention also relate to a method for transmitting data via a power distribution network.

Still further embodiments of the present invention also relate to a coupler for generating a signal usable to transmit data on a power distribution network.

Further embodiments of the present invention also relate to a device for transmitting data via a power distribution network.

Still further embodiments of the present invention relate to an improvement of the technique for transmitting signals described in international application number WO 2006/008381.

Connecting an electric element to a power distribution network causes an evanescent high-frequency oscillation in the electrical voltage carried by the network. Disconnecting the electric element also causes a similar oscillation as described in European patent number EP 1136829, a high-frequency oscillation makes a signature of the electric element which is at the origin thereof, allowing it to be identified on the electric network. EP 1136829 thus describes a method for following up the electricity consumption of a set of electrical devices of domestic or industrial type, wherein each electric element is identified by means of the high-frequency oscillation generated when the electric element is powered up or down.

U.S. Pat. No. 7,078,982 provides a method wherein such high-frequency oscillations are used to carry data through an electric network. The high-frequency oscillations are generated by a device called a coupler or interface coupler, comprising an electric element in series with a switch, the whole being connected between two wires of the electric network. A control signal carrying data is applied to the switch and alternately allows the switch to be closed and opened. Thus, the rhythm of the apparition of the high-frequency oscillations is controlled.

BRIEF SUMMARY OF THE INVENTION

Embodiments of the present invention are directed to better control of the amplitude of the high-frequency oscillations, in particular with regard to electromagnetic compatibility rules of Electromagnetic Interference/Electromagnetic Compatibility (EMI/EMC).

It is desirable to generate such high-frequency oscillations from a low voltage control signal.

It is further desirable to provide an interface coupler of simple and low-cost structure able to make high-frequency oscillations appear in response to a low voltage signal.

An embodiment of the present invention relates to a method for causing, in a power distribution network, a signal allowing data to be transmitted. The method includes connecting, between two wires of the network, at least one capacitive load in series with a circuit for modulating the amplitude of a network voltage. The amplitude modulation circuit includes at least one Zener diode in parallel with at least one switch. A short make pulse is applied to the switch, such that the switch is conductive during the duration of the make pulse and short-circuits the Zener diode by modulating the amplitude of the network voltage. The duration of the make pulse is set such that the modulation of the amplitude of the network causes a response of the network in the form of a high-frequency oscillation of the network voltage.

In one embodiment, the duration of the make pulse is determined according to the bandwidth of the network and is at least lower than 130 nanoseconds.

In one embodiment, the method further includes using a capacitive load having, when the switch is closed, a time constant greater than the duration of the make pulse.

In one embodiment, the method further includes connecting, between two wires of the network at least one capacitive load in series with a first Zener diode and a second Zener diode. A switch is connected in parallel with each Zener diode, and the switch is controlled with the make pulse.

In one embodiment, the power distribution network carries an alternating voltage and the method further includes applying the make pulse to the switch when the amplitude of the alternating voltage is greater than a threshold.

Another embodiment of the present invention relates to a method for transmitting data via a power distribution network and includes connecting, between two wires of the network, at least one capacitive load in series with a circuit for modulating the amplitude of a network voltage. The circuit for modulating the amplitude includes at least one Zener diode in parallel with at least one switch. A pulsed control signal carrying data comprising short make pulses is applied to the switch such that the switch is conductive during the duration of each make pulse and short-circuits the Zener diode by modulating the impedance of the network. The duration of each make pulse is set such that the modulation of the impedance of the network causes a response of the network in the form of a high-frequency oscillation of the network voltage.

In one embodiment, the duration of each make pulse is determined according to the bandwidth of the network and is at least lower than 130 nanoseconds.

In one embodiment, the method further includes using a capacitive load having, when the switch means is closed, a time constant greater than the duration of the make pulse.

In one embodiment, the method further includes connecting, between two wires of the network, at least one capacitive load in series with a first Zener diode and a second Zener diode. A switch is connected in parallel with each Zener diode. The switch is driven with the pulse control signal.

In one embodiment, the pulsed control signal is a coded signal.

In one embodiment, the power distribution network carries an alternating voltage and the pulsed control signal is applied by the switch when the amplitude of the alternating voltage is greater than a threshold.

In one embodiment, the capacitive load is a capacitor.

In one embodiment, the method further includes detecting oscillations that appear in the network at the rhythm of the pulsed control signal, and supplying a detection signal representative of the detected oscillations.

In one embodiment, detecting the oscillations includes supplying a filtered signal, by high-pass or band-pass filtering of the voltage carried by the network with a low cut-off frequency of a few hundred kilohertz. Noise in the filtered signal is measured and a noise threshold is supplied. The detection signal is supplied when the amplitude of the filtered signal rises above the noise threshold.

Still another embodiment of the present invention relates to a coupler for modulating the amplitude of a voltage carried by a power distribution network in order to transmit data. The coupler includes first and second connection terminals to wires of the power distribution network. At least one capacitive load and a circuit for modulating the amplitude of a network voltage in series are connected between the first and second terminals. The amplitude modulation circuit includes at least one Zener diode and at least one switch. A control input for applying a control signal to the switch controls the closing and opening of the switch, to short-circuit the Zener diode and modulate the amplitude of the network voltage.

In one embodiment, the Zener diode has a first terminal connected to a second terminal of the capacitive load, and a second terminal connected to the second connection terminal of the coupler. A first terminal of the capacitive load connected to the first connection terminal of the coupler.

In one embodiment, the coupler includes a first Zener diode having a first terminal connected to a second terminal of the capacitive load, and a first terminal of the capacitive load being connected to the first connection terminal of the coupler. A second Zener diode has a first terminal connected to a second connection terminal of the coupler and a second terminal connected to a second terminal of the first Zener diode. At least one first switch is in parallel with the first Zener diode and a second switch is in parallel with the second Zener diode. The control input is configured to apply the control signal to each switch.

A still further embodiment also relates to a device for transmitting data via a power distribution network. The device includes a coupler as set forth above. A driver circuit applies a pulsed control signal carrying data comprising short make pulses to the coupler, such that the switch of the coupler is conductive during the duration of each make pulse and short-circuits the Zener diode. The driver circuit is configured such that the duration of each make pulse for the amplitude modulation of the network voltage causes a response of the network in the form of a high-frequency oscillation of the network voltage.

In one embodiment, the driver circuit is configured such that the duration of each make pulse is lower than 130 nanoseconds.

In one embodiment, the capacitive load has, when the switch means is closed, a time constant greater than the duration of the make pulse.

In one embodiment, the device further includes a processing circuit to receive a data signal to transmit and supply the pulsed control signal as an image of the data to be transmitted according to a determined encryption.

In one embodiment, the device further includes a detection circuit configured to detect oscillations in the network, and supply a detection signal carrying data representative of the oscillations detected.

In one embodiment, the detection circuit includes a low-pass or band-pass filter receiving the voltage carried by the network and having a low cut-off frequency of a few hundred kilohertz and supplying a filtered signal. A circuit detects noise in the filtered signal and supplies a noise threshold. A circuit compares the filtered signal and the noise threshold and supplies the detection signal when the amplitude of the filtered signal rises above the noise threshold.

In one embodiment, the device includes a processing circuit for decoding the detection signal and supplying a data signal.

In one embodiment, the device includes a repeater configured to regenerate, in the network, oscillations detected by the detection circuit.

In one embodiment, the driver circuit receives the detection signal to cause the regeneration, by the coupler, of the oscillations detected by the detection circuit.

In one embodiment, the device includes a synchronization circuit for monitoring the voltage carried by the network and supplying a synchronization signal for generating oscillations.

Another embodiment of the present invention also relates to an integrated circuit on a semi-conductor chip, including a device for transmitting data as described above. The capacitive load of the coupler is external to the chip and connected to terminals thereof.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 1A, 1B respectively show a conventional coupler and a high-frequency oscillation generated by the coupler;

FIG. 2 shows the shape of a control signal applied to the coupler of FIG. 1A;

FIG. 5A shows alternating voltages in various points of the coupler as well as oscillations caused by the coupler in response to a pulsed control signal shown in FIG. 5B;

FIGS. 6A, 6B, 6C schematically show the operation of the coupler during the generation of a high-frequency oscillation;

DETAILED DESCRIPTION OF THE INVENTION

Figure 3:
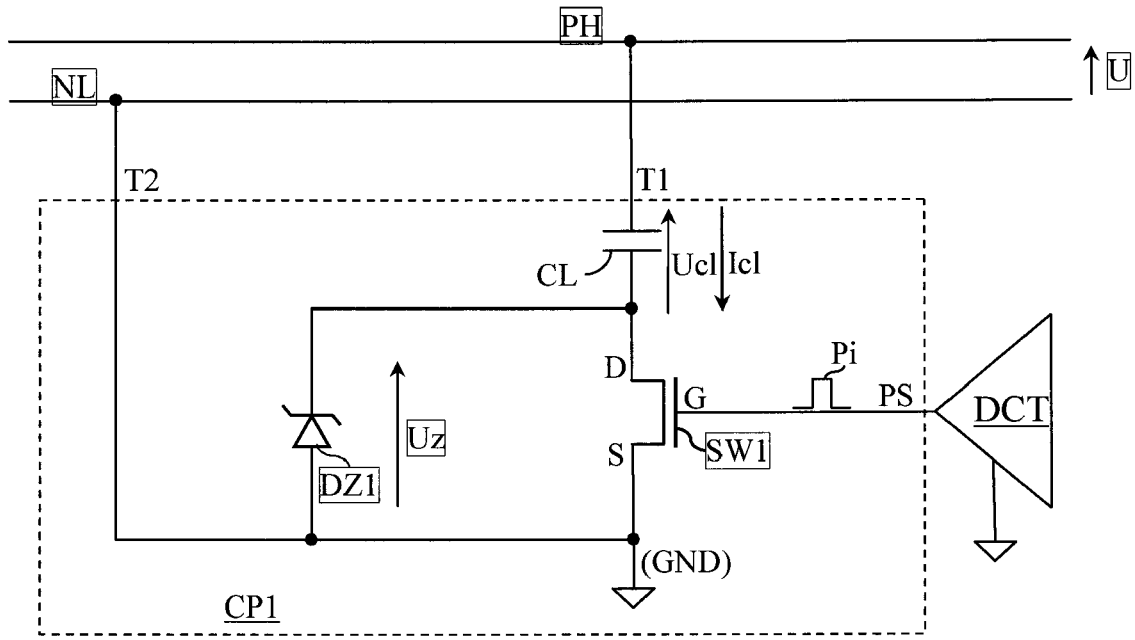
FIG. 3 is the electrical diagram of an embodiment of a coupler according to an embodiment of the present invention.

FIG. 1A shows a device for generating oscillations, or a "coupler", as described above. The coupler shown in FIG. 1A includes an electric element 1 having a terminal linked to a phase wire (PH) of a power distribution network, or "electric network," carrying an alternating network voltage U of for example 50 or 60 Hertz (Hz). The other terminal of element 1 is linked to a neutral wire (NL) of the electric network through a switch 2. The switch 2 is driven by a control signal Cs. Element 1 may be any type of electric element, such as a bulb, a light-emitting diode (LED), a capacitor, a resistor, or a combination of these elements. Electric element 1 preferably has a high impedance to avoid a high switching current from appearing on the network.

An action of closing or opening the switch 2 allows an evanescent high-frequency oscillation AMi of the type shown in FIG. 1B to appear on the electric network. An adapted coding of the signal Cs allows several oscillations AMi, forming an image of the variations of the signal Cs to be generated and thus data to be transmitted via the electric network. Detecting the signals AMi allows the signal Cs to be reconstituted and the data transmitted to be deduced therefrom.

The apparition of the oscillation AMi results from a reaction of the network to a modulation of the amplitude of the network voltage U caused by the closing or opening of the switch 2. In other words, the high-frequency oscillation AMi is not actually "injected" into the network but is caused by the network in response to a modulation of the amplitude of short duration of the network voltage. It is thus an oscillatory response. The oscillation AMi therefore does not form a signal independent of the network voltage, and would not exist without this voltage.

The oscillations AMi are "generated" by a coupler, although they are actually generated by the reaction of the network in response to the initial amplitude modulation of short duration imposed by the coupler. It is understood that the oscillations AMi of the present application can only be of short duration since they are generated by a punctual event.

In addition, the oscillatory response of the network only occurs if the duration of the amplitude modulation, i.e., the switching time of the switch 2 (closing time or opening time) is shorter than a threshold Tbw. This threshold Tbw is representative of the time constant of the network and consequently of the bandwidth thereof. More particularly, with reference to FIG. 2, generating the high-frequency oscillation during the closing of the switch 2 requires a rise time Tr of the control signal Cs, as well as the corresponding closing time of the switch 2, be lower than the threshold Tbw. Likewise, generating a high-frequency oscillation upon opening the switch 2 requires that a fall time Tf of the signal Cs, as well as the corresponding opening time of the switch 2, be lower than the threshold Tbw. In practice, a switching time Tr or Tf lower than 100 -125 nanoseconds makes it possible, for most electric networks, to cause the desired oscillatory response and make an oscillation AMi with a non-negligible amplitude appear. This observation matches measures of bandwidth, which show that the bandwidth of an electric network is generally about 3 to 4 MHz. A cut-off frequency of 4 megahertz (MHz) corresponds to a period of ¼ MHz, i.e., 250 nanoseconds, which is divided by 2 to apply the Shannon Theorem if a transmission of signals is desired, which gives a period of 125 nanoseconds as a limit of bandwidth.

In other words, the initial modulation of amplitude of the network voltage U, caused by the switch 2 switching, forms a kind of impact which temporarily makes the electric network resonate if the impact is short enough for the network not to be able to damp it. This resonance of the network is expressed by the oscillation AMi. The oscillation AMi may reach a very high peak voltage and typically has a peak of frequency of about 2-3 MHz to 12 MHz or more (i.e., a peak of frequency corresponding to the duration of the amplitude modulation pulse which makes it appear) coming with a set of lines making the spectrum of oscillation frequencies, which spreads out as it propagates in the network. The duration thereof is initially that of the amplitude modulation pulse (i.e., ten or more nanoseconds), but this duration spreads out as it propagates in the network, and may reach several dozen microseconds or even several hundred microseconds in a point further from the source point. The oscillation AMi may, in addition propagate, on a great distance along an electric line, sometimes beyond one kilometer and with a good noise/signal ratio, aiding in the detection thereof.

It is therefore desirable to provide a switching time preferably lower than 125 nanoseconds to be sure that the amplitude modulation caused by switching of the switch 2 causes a reaction of the network. In practice, switching times Tr or Tf of about ten nanoseconds may only be reached with solid state switches of the MOS or bipolar transistor type.

High-frequency oscillation AMi has a greater amplitude and is therefore easier to detect when it is generated using an electric element 1 having an impedance of low value in the field of high frequencies. It is preferable that the electric element 1 has an impedance of great value at low frequency to limit the switching current. The electric element 1 forms a load impedance that avoids a total short-circuit on the network at the time of switching the switch 2, in the field of frequencies of the network voltage. At high frequency, i.e., the field of frequencies where the oscillation caused by the reaction of the network appears, the electric element 1 must conversely preferably have the lowest impedance possible and ideally be equivalent to "a wire," so as to create a total short-circuit and thus aid the oscillatory reaction of the network.

The result is that the ideal load impedance to generate a high-frequency oscillation AMi while limiting the low frequency switching current is the capacitor, the impedance of a capacitor ($1/2\pi FC$) being greater at low frequency than at high frequency. A load impedance $Z1/jZ2$ having an imaginary part $Z2$ which increases faster according to the frequency of the real part thereof $Z1$, and which thus has a lower value at high frequency than at low frequency, may also be used. Generally, a capacitor may be considered as a particular case of capacitive load, with $Z1=1$.

The use of a capacitor, and generally of a capacitive load, does have a drawback. When the switch 2 is closed, the capacitor charges. Once the capacitor is charged, opening or closing the switch 2 has no effect on the electric network until the network voltage U passes by zero again and the capacitor discharges. A coupler equipped with a capacitor therefore is not able to generate only one high-frequency oscillation AMi by half-cycle of the voltage U. The data rate this remains limited to 100 bits per second in the case of a 50 Hz network or 120 bits per second in the case of a 60 Hz network. To obtain higher rates, other types of loads must be used (bulb, LED, resistor, etc.), but the efficiency of the coupler is reduced.

It is therefore desirable to make high-frequency oscillations appear by associating a capacitor to the switch 2 without the capacitor charging or discharging during the closing of the switch 2, such that several oscillations are generated during a same half-cycle of the network voltage. An initial idea was to apply a closing signal of very short duration to the switch 2, lower than the time constant of the capacitor. However, this solution may not be implemented with a conventional switch (MOS or bipolar transistor, for example) because it requires a control signal Cs at high voltage level, which requires complex and expensive voltage adapter systems. In addition, the switch 2 has high voltages at the terminals thereof and the closing or opening time may not be brought to the desired value (less than 125 nanoseconds) for reasons that those skilled in the art will understand. It is therefore unrealistic to manufacture at industrial scale, and at very low cost, a coupler wherein the switch 2 would be closed for a duration so short that a capacitor in series with the switch would not have the time to charge or discharge.

It is therefore desirable to provide a coupler structure using a capacitive load impedance that may be switched during a very short time by applying thereto a low voltage level control pulse, without subjecting the switch 2 to significant voltage differences.

Another technological limit of the coupler shown in FIG. 1A is that the amplitude of the oscillation caused by the closing of the switch 2 depends on the amplitude of the network voltage. It can reach extremes during switching when the network voltage is at the maximum. An oscillation of such amplitude may not be desirable regarding the electromagnetic compatibility rules.

It is therefore desirable to control the amplitude of the oscillations generated by the coupler and ensure that it is substantially constant and independent of the value of the network voltage.

FIG. 3 shows an embodiment of a coupler CP1 according to an embodiment of the present invention. The coupler CP1 includes two terminals T1, T2 respectively connected to the phase wire PH and the neutral wire NL of an electric network carrying an alternating voltage U. The coupler includes, between the terminals T1 and T2, a capacitive load CL in series with a circuit for modulating the amplitude of the network voltage U. The capacitive load is preferably a capacitor CL. The amplitude modulation circuit includes a switch SW1, preferably a MOS transistor, and a Zener diode DZ1 in parallel.

A terminal of the capacitor CL is connected to the terminal T1 and the other terminal of the capacitor is connected to a terminal of the switch SW1, such as the drain (D) of the MOS transistor, and the cathode of the diode DZ1. The other terminal of the switch SW1, such as the source (S) of the MOS transistor, is connected to the anode of the diode DZ1 and the terminal T2 of the coupler. A terminal for controlling the switch SW1, such as the control gate (G) of the transistor, receives a pulsed signal PS comprising make pulses Pi. The signal PS is supplied by a driver circuit DCT having the same potential reference (ground or GND) as the coupler, e.g., the terminal T2 connected to the neutral wire NL.

It will be assumed hereinafter that the Zener diode has a Zener voltage of around 30V when it is backward biased, and a direct voltage equal to 0 when it is forward biased (this voltage is actually not equal to zero but very close to zero, for example 0.6V).

Figure 4A:
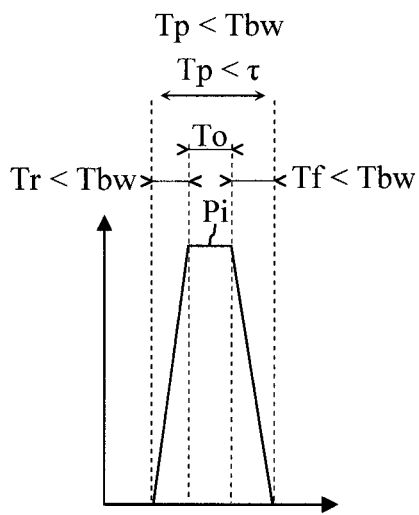
FIGS. 4A, 4B show two examples of make pulses applied to the coupler of FIG. 3.
Figure 4B:
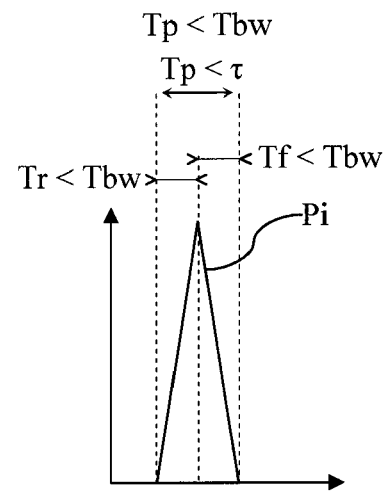

FIGS. 4A, 4B show two examples of make pulses Pi applied to the coupler. The pulse Pi shown in FIG. 4A has a rise time Tr (closing the switch SW1), a plateau time To (maintaining the switch in the conductive state), and a fall time Tf (reopening the switch SW1). As described above, the rise time Tr and the fall time Tf must be lower than the threshold Tbw described above to cause an oscillatory reaction of the network. Accordingly, the total duration Tp of the pulse (i.e. Tr+To+Tf) is lower than the threshold Tbw such that the network cannot react both to the closing and the opening of the switch SW1 and a closing/reopening cycle of the switch SW1 causes one oscillation only. In preferred embodiments, the times Tr and Tf are about 10 to 20 nanoseconds and the time to is about 50 to 100 nanoseconds respectively.

The pulse Pi shown in FIG. 4B is a variation of that shown in FIG. 4A and only differs in that the plateau time To has been brought to 0. As previously, the total duration Tp of the pulse (Tr+Tf) is lower than the threshold Tbw for a closing/reopening cycle of the switch SW1 to cause the apparition of one oscillation in the network.

In addition, the capacitor used is chosen to have a time constant greater than the duration of the pulse Pi, such that the capacitor does not have the time to significantly charge or discharge during the closing time of the switch SW1.

FIGS. 5A, 5B show the operation of the coupler in alternating operating conditions. FIG. 5A shows voltages appearing in various points of the coupler and oscillations AMi generated by the coupler in the network voltage U in response to make pulses Pi are shown in FIG. 5B.

The group transistor/diode is here assumed to be purely resistive. The current passing through the capacitor CL is thus in 90° phase lead in relation to the voltage Ucl at the terminals of the capacitor. FIG. 5A shows the voltage U at the terminals of the coupler, the voltage Ucl at the terminals of the capacitor CL, the voltage Uz at the terminals of the Zener diode DZ1 and the current Icl($\pi$/2) passing through the coupler, in 90° phase lead in relation to the voltage Ucl, as well as the corresponding Fresnel diagram (DF). The voltage Ucl is in quadrature with the voltage Uz while the phase difference $\phi$ of the voltage Uz and the current Icl in relation to the voltage U is between 0 and 90° and is a function of the global phase of the coupler impedance seen between the terminals T1, T2 thereof. The voltage of the diode Uz rapidly goes from 0 to 30 V when the current Icl increases and remains equal to the 30V Zener voltage during the entire positive sinusoid that the current travels until the current Icl goes back toward 0 and goes towards the negative values of the sinusoid.

FIG. 5B also shows make pulses Pi, Pi+1, . . . Pi+n applied to the coupler and making the pulsed signal PS. The pulses Pi are applied to the coupler when the voltage Uz is equal to the Zener voltage, here 30V (to that end, the generation of the pulses Pi is linked to a synchronization signal described hereinafter). Oscillations AMi, AMi+1, . . . AMi+n appear in the voltage U each time a pulse Pi is applied to the coupler. Thus, as it will be described below, the coupler makes it possible to manufacture a "multipulse" transmitter, this neologism referring to a transmitter able to apply several amplitude modulation pulses to the electric network during an alternation of the voltage U.

FIGS. 6A to 6C show in greater details the mechanism of the amplitude modulation that the coupler applies to the network, the reaction of the network then causing the high-frequency oscillation. The Zener diode is modeled in these figures by an equivalent diagram including a capacitance Cz (coupling capacitance and internal capacitance) in parallel with a resistor Rz.

In FIG. 6A, the switch SW1 is opened, the voltage Uz of the Zener diode is equal to 30V, and the voltage Ucl of the capacitor CL is such that the vectorial equality shown by the Fresnel diagram DF in FIG. 5A is verified, i.e., U=Ucl+Uz (vectorial), i.e., U=Ucl+30V.

In FIG. 6B, a make pulse Pi (PS=Pi) is applied to the coupler. The switch SW1 becomes conductive and is shown by the equivalent serial resistor thereof, referred to as Ron (for example the resistor in the conductive state RDSon of the MOS transistor used as switch). This resistor Ron is of very low value and short-circuits the serial resistor Rz of the Zener diode. The capacitance Cz of the Zener diode discharges in the resistor Ron (discharge current id) in a very short time, lower than the duration of the pulse Pi.

Regarding the capacitor CL, it will first be noted that the time constant of the capacitor CL seen from the terminals T1, T2 of the coupler is equal to Ccl*Ron, according to the present equivalent diagram, Ccl being the capacitance of the capacitor CL, while the time constant of the diode is equal to Cz*Ron. The capacitance Cz of the Zener diode is very low in relation to the capacitance Ccl (on the order of picofarads to nanofarads) and the time constant of the capacitor CL is much greater than that of the capacitance Cz (the capacitor having been chosen so that the time constant thereof is greater than the duration of the pulse Pi).

The voltage at the terminals of the diode DZ1 therefore drops sharply long before the capacitor CL has the time to "react" due to the greater time constant thereof. The capacitor CL therefore does not have the time to "absorb" the sharp voltage variation at the terminals of the Zener diode, (i.e., absorb the 30 V voltage difference that the closing of the switch imposes). In addition, the voltage difference is too short for the network to absorb it. Thus, the network voltage U is sharply pulled downwards, as shown in FIG. 6B (U-30V). This sharp pull down effect causes the oscillatory reaction of the network described above.

In FIG. 6C, the signal PS switches back to 0 (assuming that the 0 voltage of the signal Pi corresponds to a control of the switch in the open state) and the 30V voltage at the terminals of the Zener diode is restored, thanks to a current ic which rapidly charges the capacitance Cz of the diode, which becomes conductive again.

Referring again to FIG. 5A, it is also observed that due to the voltage/current phase difference $\phi$ in the coupler, the closing of the switch SW1 while the network voltage U passes by 0 after being positive also causes a high-frequency oscillation (AMi+k oscillation), due to the fact that the voltage Uz of the Zener diode is still equal to 30V. Likewise, the closing of the switch SW1 while the network voltage U is at the beginning of the negative cycle thereof also causes a high-frequency oscillation as long as the diode voltage Uz is still equal to 30V (AMi+n oscillation).

The capacitor CL is assumed not to charge at all during the switch closing period. However, even if the capacitor CL accumulates complementary electric charges during this period, the amount of absorbed charges causes an increase of the voltage Ucl thereof, which is low in relation to the 30V voltage difference caused by the closing of the switch SW1. Thus, the Zener diode becomes conductive again at the end of the closing period, and possibly has a lower voltage, but near the rated 30V, which is rapidly compensated by the variations of the voltage U.

Two make pulses Pi are preferably separated by a relaxation time greater than the duration thereof due to the temporal and frequency spreading of the high-frequency oscillation AMi when it propagates in the network, to avoid a temporal overlap phenomenon of the oscillations. This relaxation time is, for example, on the order of several microseconds. Embodiments of the present invention however make it possible to achieve transmitting data with a high rate in relation to the other known low-cost methods based, for example, on the principle of the discharge of a capacitor. The method described herein makes it possible to move energy edges in an electric network without injecting energy into the network. The implementation cost is therefore very low in relation to that of the "active" methods requiring injecting energy, like the carrier current methods.

In brief, the coupler CP1 is a simple and low cost device, which does not carry significant power and does not inject energy. It only behaves like an exciter that causes a reaction in the electric network. By comparing the network and the voltage U to an elastic line, the coupler CP1 makes it possible to pull the line very rapidly downwards and to loosen it sharply. The result is that the line starts vibrating locally and the wave packet generated at the initial point propagates along the line.

Another advantage of the coupler CP1 is that the switch SW1 operates under a low voltage imposed by the Zener diode DZ1, here 30V. It may consequently be controlled with a low voltage signal PS, for example 5V. It thus becomes possible to drive the coupler CP1 with an integrated circuit of ASIC type (application specific integrated circuit) and therefore significantly reduce the manufacturing costs and the dimensions of the coupler.

In addition the Zener diode allows the amplitude of the amplitude modulation to be controlled, here 30V, independently of the value of the network voltage. The latter must however be greater than 30V (to the phase difference $\phi$) such that the Zener diode is conductive, so that the coupler CP1 is a half-wave device.

In preferred embodiments, make pulses Pi have a duration of about 50 to 100 nanoseconds. The capacitor CL gains little or no charge and a great number of oscillations AMi may be generated at each half-cycle of the network voltage with a relaxation time of about ten microseconds. As an embodiment intended for a 230V network, the capacitor CL has a rated voltage of around 270 V and a capacitance of 50 nF, the diode DZ1 is a 30V diode of ZENER type, and the capacitance Cz thereof is rated at about 50 pF. The switch SW1 is a CMOS transistor having a 60V drain-source rated voltage VDS and a resistance RDSon of several ohms.

Figure 7A:
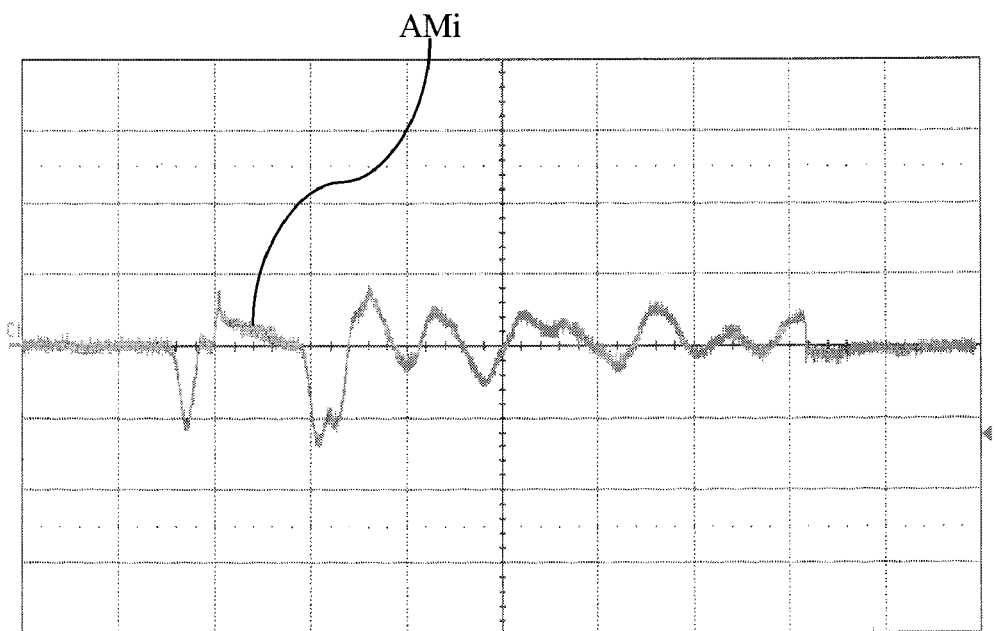
FIGS. 7A, 7B, 7C show examples of high-frequency oscillations captured with an oscilloscope, FIG. 7C also shows a voltage of a Zener diode.
Figure 7B:
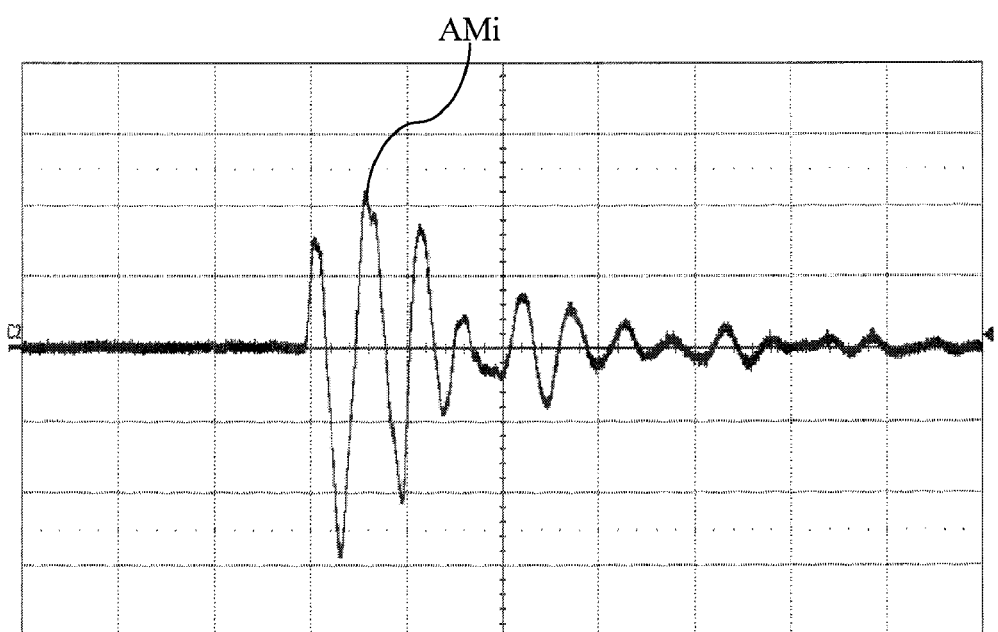

FIGS. 7A and 7B show with a great temporal enlarging (horizontal scale) two examples of oscillations AMi captured using an oscilloscope in different electric networks and at different distances from the point of the oscillations, where the coupler CP1 was connected. In FIG. 7A, the vertical scale is of 20 mV by division and the horizontal scale of 500 nanoseconds by division. In FIG. 7B, the vertical scale is of 100 mV by division and the horizontal scale of 1 microsecond by division. The oscillations AMi spread over several microseconds. On an even further point, the duration thereof may reach several hundred microseconds due to the spreading of the wave packet, which is the result of the dispersion relationship not being linear, the group speed, and the phase speed being different.

Figure 7C:
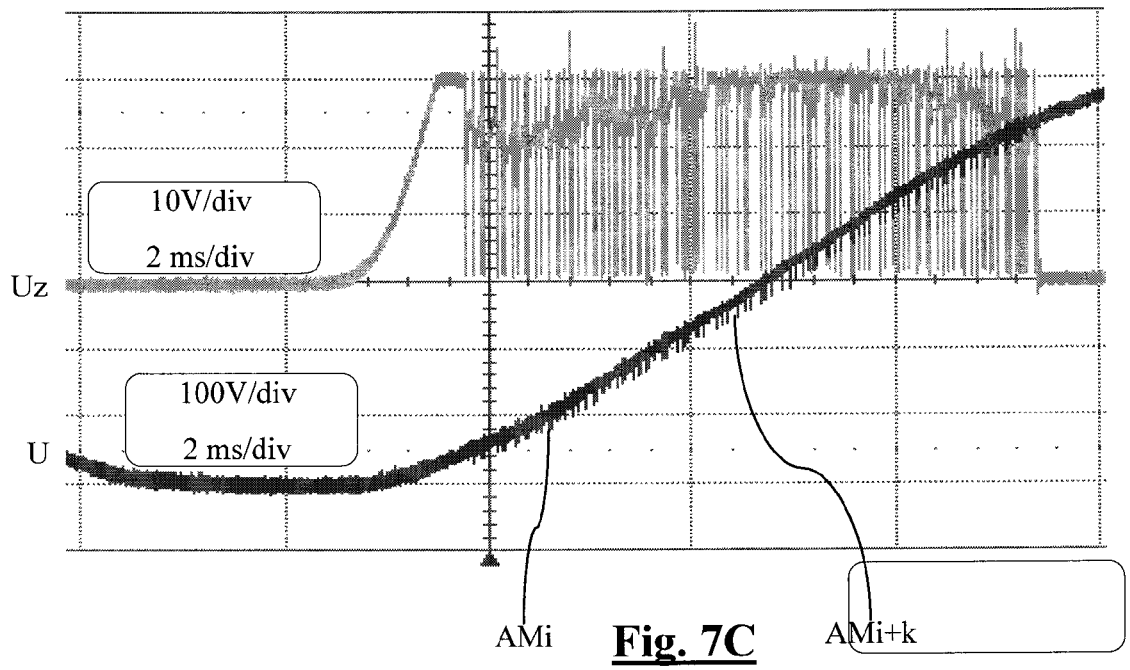

FIG. 7C shows various high-frequency oscillations Ami–AMi+k captured using an oscilloscope with a temporal scale of 2 ms by division. The oscillations AMi appear here as small pikes which modulate the amplitude of the network voltage U. The oscillating shape does not appear due to the temporal scale, which is less distended than before. This drawing also shows the voltage Uz at the terminals of the Zener diode, modulated by various successive closings of the switch. Each modulation of the Zener voltage corresponds to an oscillation AMi.

Figure 8:
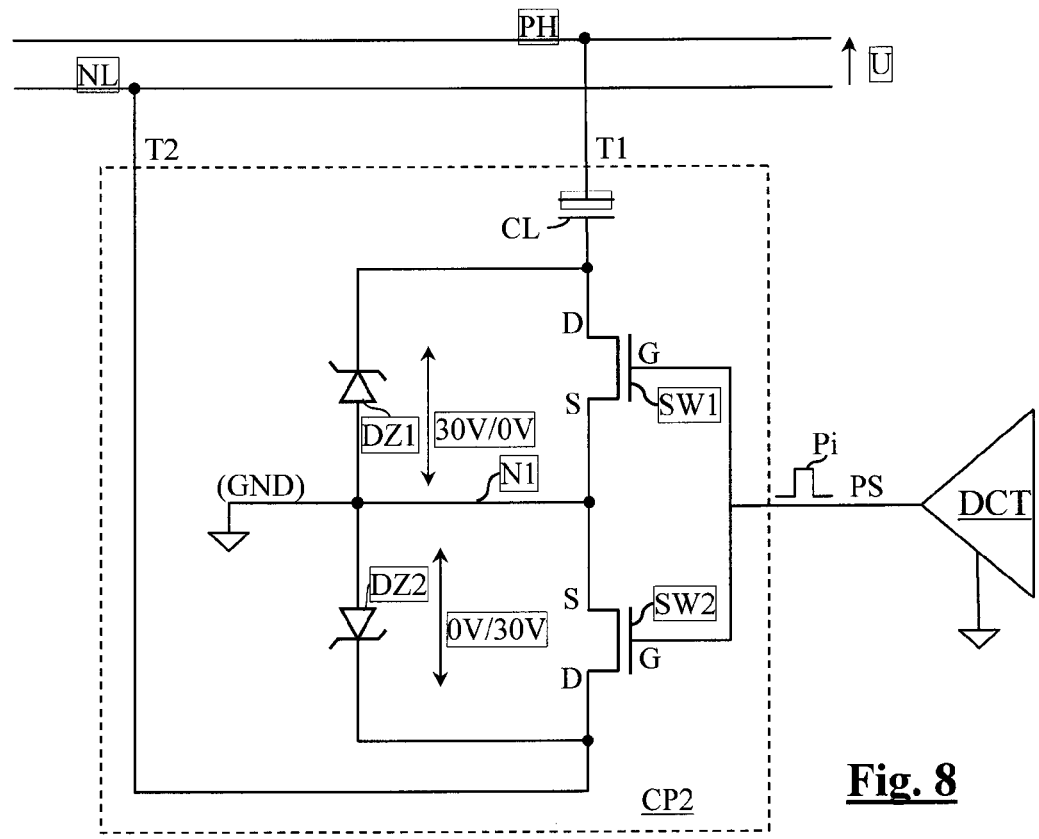
FIG. 8 is the electrical diagram of another embodiment of a coupler according to an embodiment of the present invention.

FIG. 8 shows a full-wave coupler CP2 according to the invention. The coupler CP2, includes terminals T1, T2 respectively connected to the phase wire PH and the neutral wire NL of the network, a capacitor CL, a switch transistor SW1, and a Zener diode DZ1. It also includes a switch SW2 and a Zener diode DZ2. The capacitor CL is connected between the terminal T1 and the switch SW1. The switch SW2, also a MOS transistor, is connected in series with the switch SW1. Thus, the source terminal (S) of the transistor SW1 is connected to the source terminal (S) of the transistor SW2 and the drain terminal (D) of the transistor SW2 is connected to the terminal T2 of the coupler. The diode DZ1 is connected in parallel with the transistor SW1 and the diode DZ2 in parallel with the transistor DZ1. The diodes are arranged so that one is biased in the inverse direction when the other is biased in the conductive direction. More particularly, the anode of the diode DZ1, the anode of the diode DZ2 and the sources (S) of the switch transistors are connected to a common node N1, potential of which makes the ground potential GND of a device DCT supply the make pulses Pi of the signal PS applied to the coupler. The signal PS is applied both to the control gate (G) of the transistor SW1 and the control gate (G) of the transistor SW2.

When the voltage U is positive, the diode DZ1 is biased in the inverse direction and the voltage at the terminals thereof is the rated voltage of the inverse mode, for example 30V. The diode DZ2 is biased in the conductive direction and the voltage at the terminals thereof is equal to zero (according to the simplifying approximation described above). The coupler CP2 is preferably the equivalent of the coupler CP1 regarding the equivalent electrical diagram. When the voltage U is negative, the diode DZ2 is biased in the inverse direction and the voltage at the terminals thereof is the rated voltage of the inverse mode, for example 30V. The diode DZ1 is biased in the conductive direction and the voltage at the terminals thereof is equal to zero (still according to the simplifying approximation described above). The coupler CP2 is preferably the equivalent of the coupler CP1, terminals T1 and T2 of which would have been respectively connected to the neutral wire and phase wire instead of being respectively connected to the phase wire and neutral wire. It should be noted that the explanation above does not take into account the current/voltage phase difference for simplicity reasons. Actually, the periods when the diode DZ1 and then the diode DZ2 are inverse biased are phase shifted by $\phi$ in relation to the voltage U.

The coupler CP2 is therefore the equivalent of two couplers CP1, of which the connections of the terminals T1, T2 would be inverted in relation to the phase and neutral and would be driven by the same signal PS. Thus, another embodiment of a full-wave coupler according to the present invention may also include arranging two couplers CP1 in parallel and to invert the polarities thereof in relation to the phase and neutral wires.

The embodiments of couplers according to the present invention, which have just been described, are susceptible of various embodiments regarding the constitutive elements thereof. Other types of switches may be provided, for example, bipolar transistors. Several Zener diodes may be arranged in parallel or in series to make an equivalent Zener diode.

A coupler CP1, CP2 according to embodiments of the present invention may be controlled with a small signal (5V for example) if it is used in an electric network carrying a low voltage, such as below 300 V. It may advantageously be integrated with the control logic thereof into a low-cost integrated circuit, which allows it to be easily integrated into various types of devices so that they may exchange data via the electric network (computers, electric shutters, streetlights etc.). The applications in home automation or computer science are thus wide spread. Such an example of application is described below.

Figure 9:
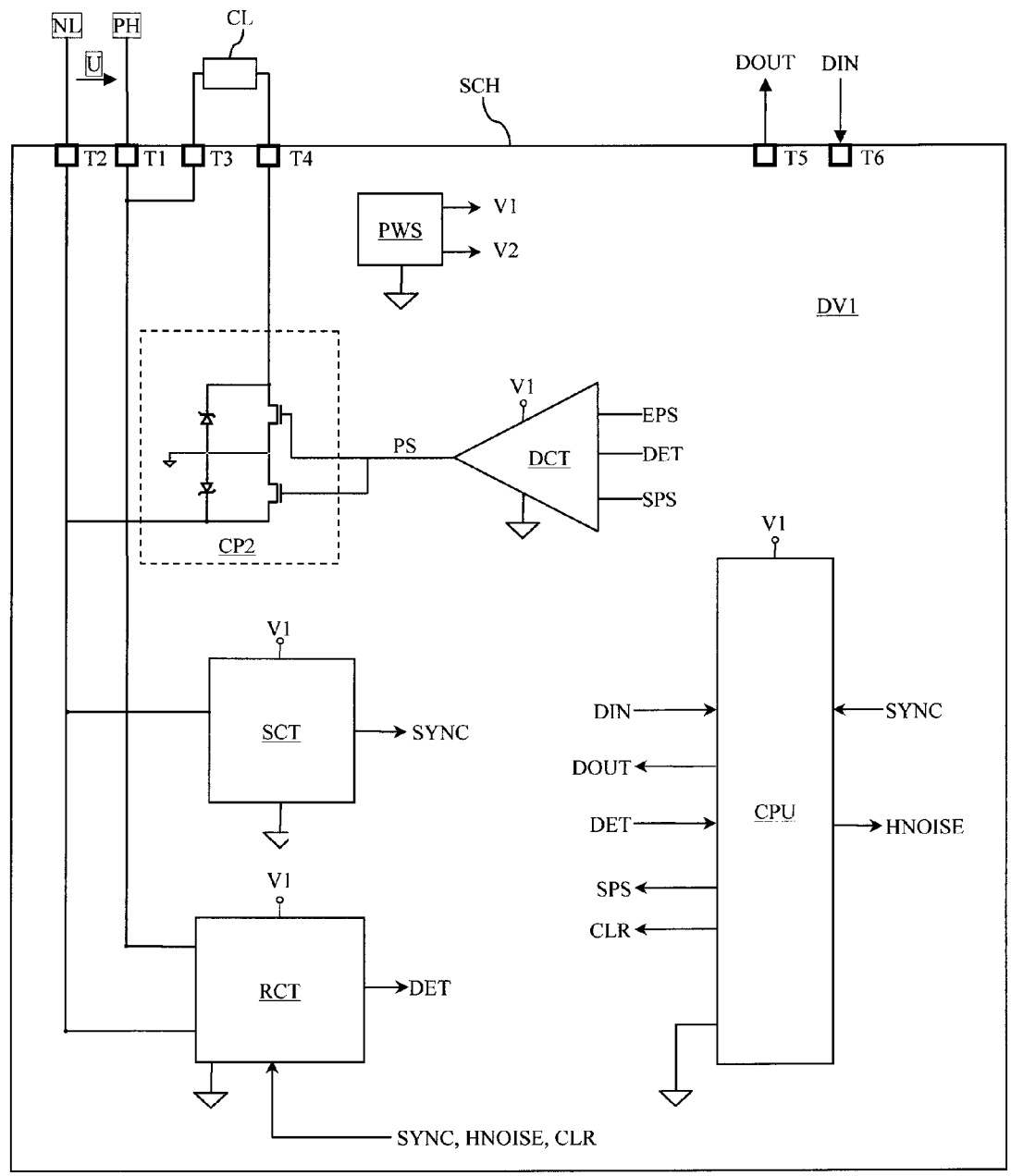
FIG. 9 is a block diagram of an embodiment of a device for transmitting data according to an embodiment of the present invention comprising the coupler of FIG. 8.

FIG. 9 shows the structure of a device for transmitting data DV1 of the "multipulse" type, including the coupler CP2. The whole device DV1 is made in the form of integrated circuit on a semiconductor chip SCH, including the coupler CP2, except for the capacitor CL, which is an external component. The semiconductor chip SCH comprises terminals T1, T2, T3, T4, T5, and T6 in the form of metalized contact pads. The terminals T1, T2 are respectively connected to the phase wire PH and neutral wire NL of an electric network. The terminals T3, T4 are provided to connect the capacitor CL to the integrated circuit, the terminal T4 being linked to the switch SW1 of the coupler CP2 and the terminal T3 linked to the terminal T1. The terminal T5 allows the device to transmit data DOUT and the terminal T6 to receive data DIN. Various other terminals may be provided on the chip, for example power, test, or the like terminals, only the main elements of the device DV1 are described herein.

The device DV1 comprises a power supply circuit PWS, a circuit DCT to drive the coupler CP2, a synchronization circuit SCT, a detection circuit RCT, and a central unit circuit or CPU, which may be a microprocessor or a wired-logic sequencer (state or programmable logic machines).

The circuit PWS supplies various electrical voltages required for the operation of the integrated circuit and the components thereof. Two voltages V1, V2 are shown here and in FIGS. 10A-10C described below.

The detection circuit RCT is connected to the terminals T1, T2 and monitors the network voltage U. It supplies a logic signal DET (Detection Pulse) which switches, for example, to 1 when a high-frequency oscillation AMi is detected in the voltage U, and which is then reset by the CPU with a signal CLR.

The circuit DCT supplies the make pulses Pi of the signal PS that drive the coupler CP2. It receives input control logic signals EPS (Enable Pulse), SPS (Send pulse) supplied by the CPU as well as the signal DET supplied by the detection circuit RCT.

The CPU receives the signal DET, decodes it, and extracts therefrom the data carried by the network. The data may then be supplied to the terminal T5 as data DOUT. The data may also be data for internal use, such as communication protocol data, commands received via the network, or the like.

The data DIN applied to the terminal T6 is read by the CPU and may for example comprise commands and data to be transmitted on the network through the circuit DCT and the coupler CP2. The data may also be commands for internal use, for example commands for reading or writing a data memory of the CPU (not shown).

The synchronization circuit SCT is connected to the terminal T1 and monitors the network voltage U present on the phase wire. It supplies a binary synchronization signal SYNC which is used to elaborate an internal synchronization signal by the CPU. The signal SYNC, for example, switches to 1 when the voltage U or the current $Icl(\pi/2)$ reaches a certain value, which allows the CPU to determine the time when one of the Zener diodes DZ1 or DZ2 of the coupler has the rated voltage of the inverse mode, here 30V.

Figure 10A:
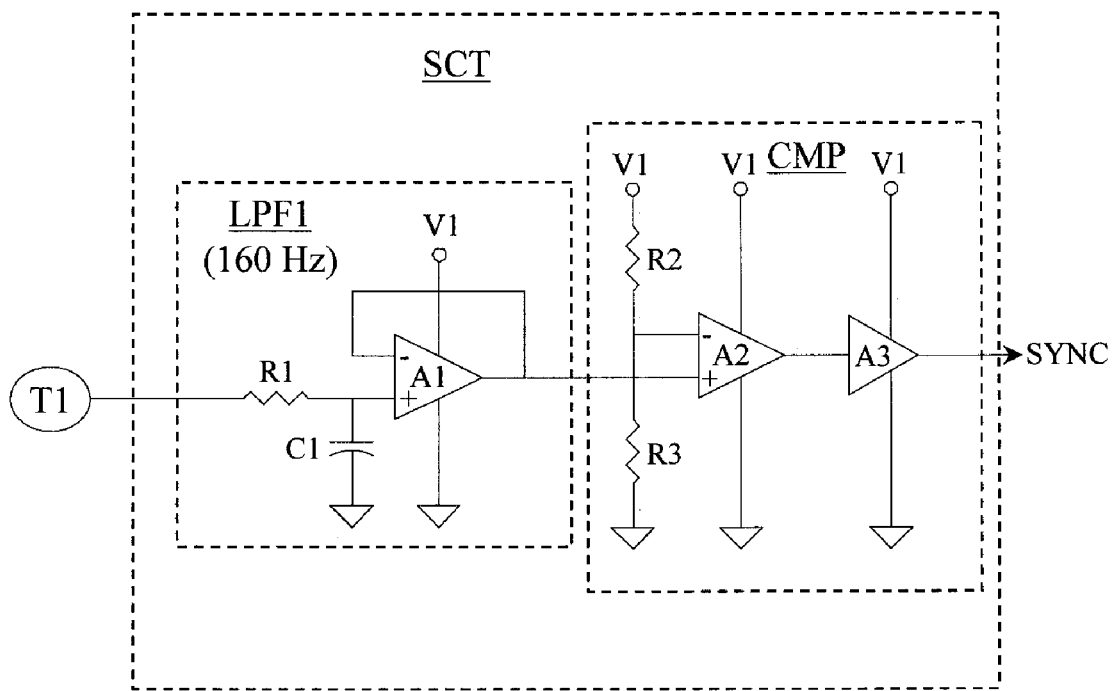
FIGS. 10A, 10B, 10C are electrical diagrams of embodiments of elements shown in block form in FIG. 8.

FIG. 10A shows an embodiment of the circuit SCT. The circuit comprises a low-pass filter LPF1, the input of which is connected to the terminal T1 and the output of which attacks a comparator CMP. The filter LPF1 includes a resistor R1, a capacitor C1, and an amplifier A1 mounted in follower. It includes, for example, a cut-off frequency of about 160 Hz. The comparator CMP includes a differential amplifier A2, a voltage divider bridge powered by the voltage V1 comprising two resistors R2, R3 and supplying a reference voltage on a negative input of the amplifier A2, the positive input of the amplifier receiving the output of the filter LPF1. The output of the comparator A2 is applied to the input of a non-inverting logic gate A3, the output of which supplies the signal SYNC. The filter LPF1 integrates the network voltage U and supplies a continuous voltage, the variations of which are the image of the voltage U. The signal SYNC switches to 1 when the continuous voltage reaches the voltage reference supplied by the divider bridge R2, R3.

Figure 10B:
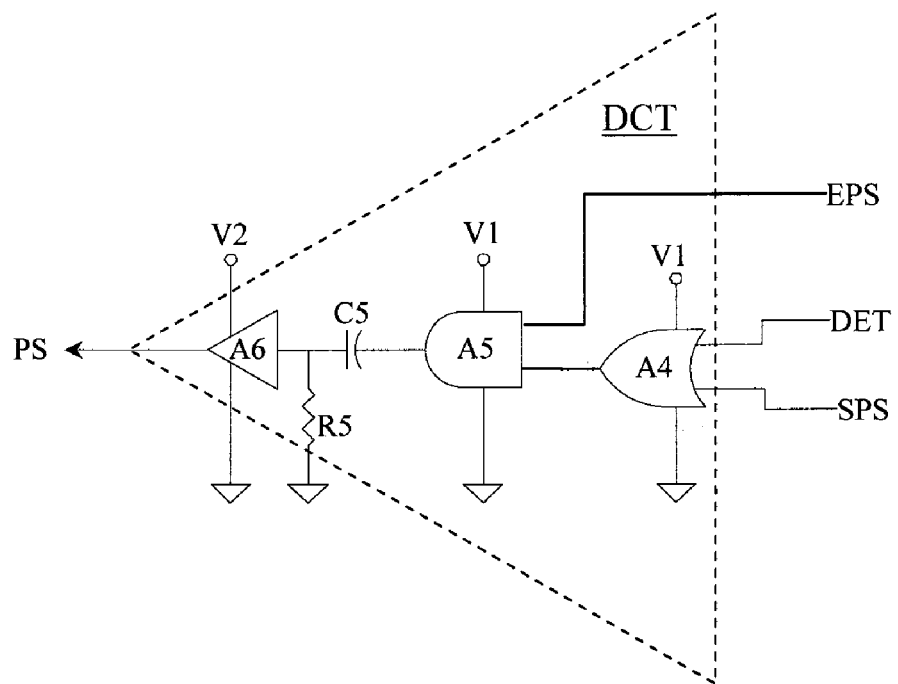

FIG. 10B shows an embodiment of the circuit DCT. The circuit includes a gate A4 of OR type receiving the signals DET and SPS, the output of which is linked to an input of a gate A5 of AND type and the other input of which receives the authorization signal EPS. The output of the gate A5 attacks a high-pass filter comprising a capacitor C5 and a resistor R5, the function of which is to transform in a voltage pulse a switching to 1 of the output of the gate A5. The output of the low-pass filter is applied to an amplifier A6 powered by the voltage V2, which supplies the closing control pulses Pi of the switches of the coupler CP2 (signal PS).

It should be noted that the application of the detection signal DET to the driver circuit DCT is an optional feature which allows the device DV1 to be used as a repeater. Thus, when the circuit RCT detects oscillations AMi and supplies the signal DET, the signal DET is reinjected into the driver circuit DCT, which then applies a make pulse Pi to the coupler CP2 so as to regenerate the oscillation detected. The reset of the authorization signal EPS allows the CPU to inhibit the repeater mode.

Figure 10C:
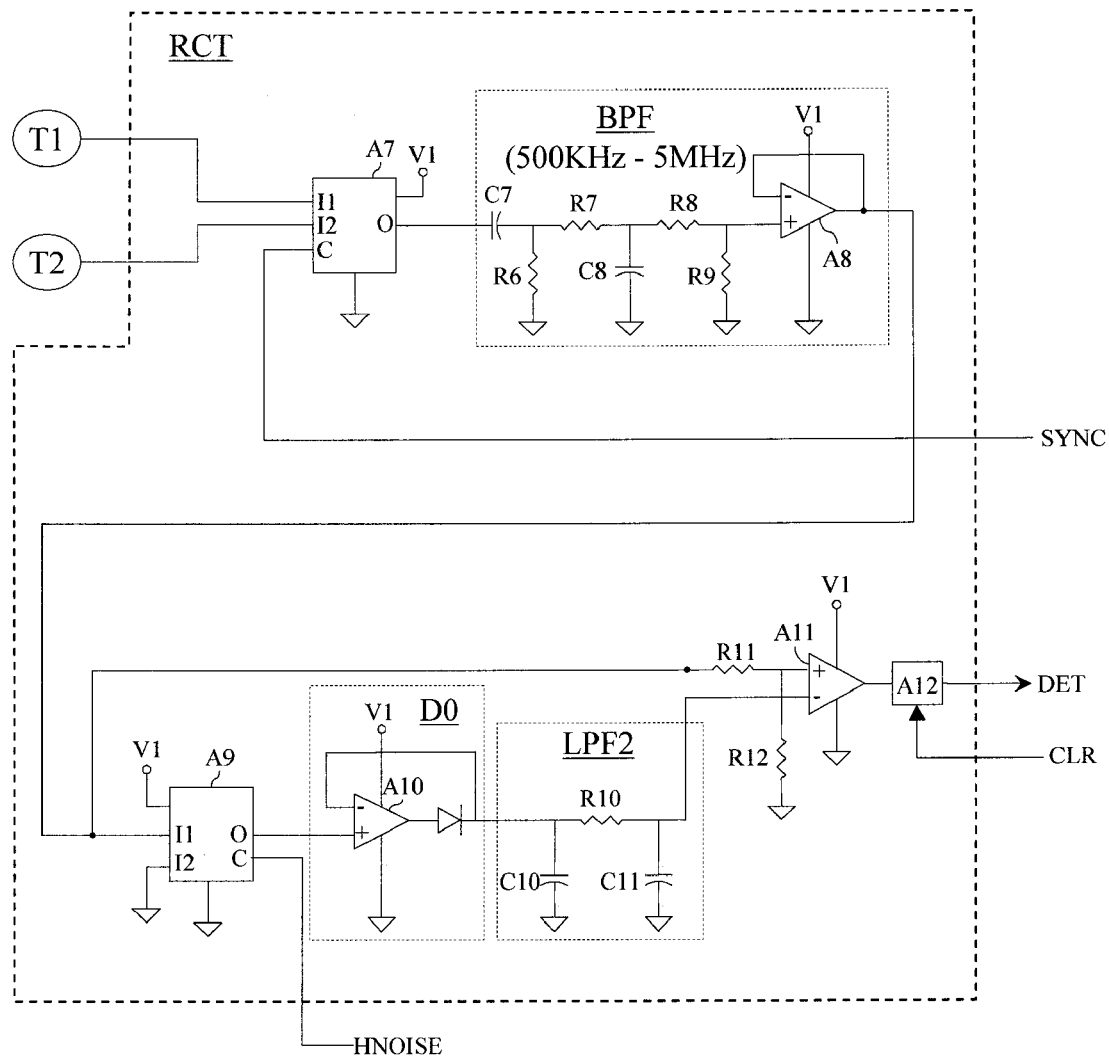

FIG. 10C shows an embodiment of the detection circuit RCT. The circuit RCT includes a switch A7 having two inputs I1, I2 and an output O, and a control input C driven by the signal SYNC. The input I1 is connected to the terminal T1 of the device DV1 and the input I2 is connected to the terminal T2. The output O is alternately linked to the input I1 or the input I2 according to the value of the signal SYNC. The output O is applied to the input of a high-pass or band-pass filter, preferably a band-pass filter BPF of 500 KHz-5 MHz, provided to filter the low frequency components of the network voltage U and let the high-frequency oscillations pass. As shown, the filter comprises, for example, resistors R6, R7, R8, R9 and capacitors C7, C8, and the output thereof comprises an amplifier A8 mounted in follower. The output of the filter BPF is applied to the input I1 of a switch with two inputs A9 of the type previously described, the other input I2 of which is connected to the circuit ground. The control input C of the switch receives a noise acquisition signal HNOISE supplied by the CPU. The output O of the switch is applied to the positive input of an amplifier A10, the output of which is connected to the anode of a pn junction diode D1, and the negative input of which is linked to the cathode of the diode D1. The amplifier A10 forms with the diode D1 a diode without threshold D0. The output of the diode without threshold D0 (cathode of the diode D1) is connected to a low-pass filter LPF2 comprising a capacitor C10, a resistor R10, and a capacitor C11. The output of the filter LPF2 is applied to the negative input of an amplifier A11 mounted in comparator. The positive input of the amplifier A11 is linked to the output of the band-pass filter BPF (i.e. the input I1 of the switch A9) through a voltage divider bridge comprising resistors R11, R12. The output of the comparator switches to 1 when a high-frequency oscillation AMi appears on the positive input thereof. The signal supplied by the comparator is locked by a latch A12, the output of which supplies the signal DET. When the signal DET is read by the CPU, it resets the latch A12 using the signal CLR, so that a new oscillation AMi may be detected.

The string of components which spread from the switch A9 to the negative input of the comparator A11 is a string for integrating the high frequency noise present in the network voltage U1. The noise integration string is activated by the CPU using the signal HNOISE during relaxation periods which spread between two oscillations AMi. The signal HNOISE is, for example, switched to 1 so that the input I of the switch A9 lets the filtered signal supplied by the filter BPF pass. This signal, which exclusively consists of the high frequency noise present in the voltage U in the absence of pulse AMi, is rectified by the diode without threshold D0. It is then integrated by the low-pass filter LPF2. Thus, the amplifier A11 receives on the negative input thereof a reference voltage representative of the noise for the detection, on the positive input thereof, high-frequency oscillations generated on the network by a device similar to the device DV1. According to certain communication protocols, the oscillations AMi are generated on the network at predetermined instants calculated in relation to the signal SYNC. The CPU therefore knows in which temporal window an oscillation must be detected and controls the signal HNOISE so that the integration of the noise at the input of the comparator is made before an oscillation AMi appears.

Figure 11:
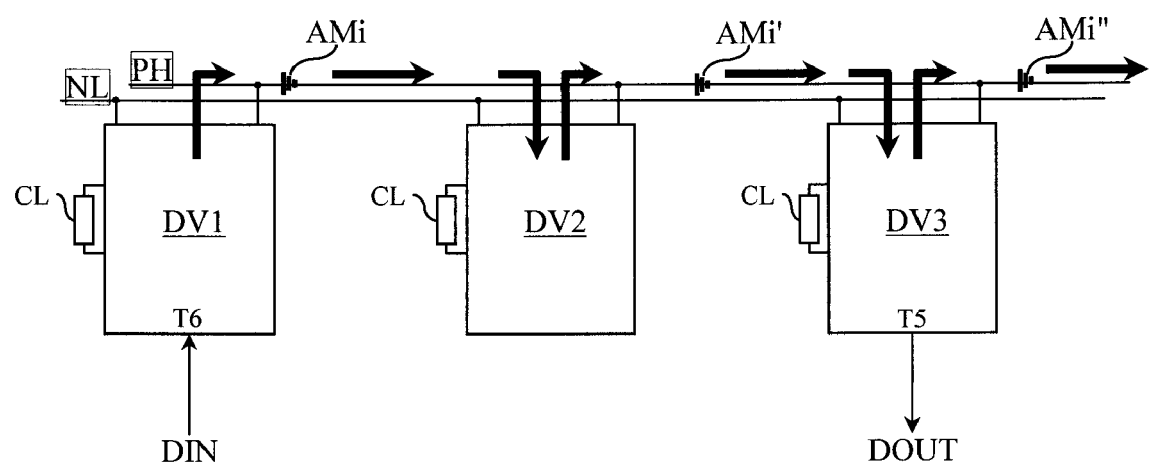
FIG. 11 shows a system for exchanging data through an electric network using couplers according to an embodiment of the present invention.

FIG. 11 schematically shows a data transmission through the electric network by a system including three devices for transmitting data DV1, DV2, DV3 similar to that which has just been described. It is assumed, for example, that the device DV1 receives through the terminal T6 thereof data DIN to be transmitted on the network and a command indicating the identity of the recipient device. The device DV1 sends data as well as the identity of the recipient in the form of high-frequency oscillations AMi. The oscillations AMi are detected and repeated by each device DV2, DV3, which are here configured in repeaters, to form oscillations AMi', AMi'' which are nearly superimposed temporally. The duration of a make pulse Pi is small in relation to the duration of an oscillation AMi and to the relaxation time. If the device DV3 is further from the device DV1 than the device DV2, the repetition of the signals AMi by the device DV2 makes the detection thereof by the device DV3 easier. In addition, each device DV2, DV3 reads and decodes the data and determines whether it is the recipient designated. The recipient of the data, for example the device DV3, may be brought to transmit the data on the terminal T5 thereof if the data are intended for a device wherein it is integrated. It may also interpret the data and transmit different data on the terminal T5 thereof, for example, a command for closing a shutter or a door.

If the data includes a command requiring a response, the device which recognizes itself answers to the command by generating oscillations AMi, and the other devices act as repeaters while analyzing the data that they repeat to determine whether it is intended for them. The devices DV1, DV2, DV3 are made in the form of small semiconductor chip. They are very low cost due to their simplicity and they may be integrated into various more expensive electrical or electronic devices without significantly modifying their costs. The invention thus offers a new, low-cost data transmission technology to help the development of automation and home automation in the more usual, domestic or industrial environments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for causing, in a power distribution network, a signal allowing data to be transmitted, the method comprising:
   connecting, between two wires of the network, at least one capacitive load in series with a circuit for modulating the amplitude of a network voltage, the amplitude modulation circuit including at least one Zener diode in parallel with at least one switch;
   applying to the switch a pulsed data carrying control signal comprising short make pulses, such that the switch is conductive during the duration of each one of the make pulses and short-circuits the Zener diode, thereby modulating the amplitude of the network voltage; and
   setting the duration of the make pulses to be less than 130 nanoseconds and less than a time constant of the capacitive load to cause an oscillatory response of the network at a resonance frequency thereof in the form of a high-frequency oscillation of the network voltage.

2. The method according to claim 1, further comprising:
   Connecting, between two wires of the network, at least one capacitive load in series with a first Zener diode and a second Zener diode;

connecting a switch in parallel with each Zener diode; and controlling the switch with the make pulse.

3. The method according to claim 1, wherein the power distribution network carries an alternating voltage and further comprising:

applying the make pulse to the switch when the amplitude of the alternating voltage is greater than a threshold.

4. A method for transmitting data via a power distribution network comprising:

connecting, between two wires of the network, at least one capacitive load in series with a circuit for modulating the amplitude of a network voltage, the circuit for modulating the amplitude including at least one Zener diode in parallel with at least one switch;

applying to the switch a data carrying pulsed control signal comprising short make pulses, such that the switch is conductive during the duration of each make pulse and short-circuits the Zener diode and thereby modulates the impedance of the network; and setting the duration of each make pulse less than 130 nanoseconds and less than a time constant of the capacitive load to cause an oscillatory response of the network at a resonant frequency thereof in the form of a high-frequency oscillation of the network voltage.

5. The method according to claim 4, further comprising:
Connecting, between two wires of the network, at least one capacitive load in series with a first Zener diode and a second Zener diode;

connecting a switch in parallel with each Zener diode; and driving the switch with the pulse control signal.

6. The method according to claim 4, wherein the power distribution network carries an alternating voltage and wherein the pulsed control signal is applied by the switch when the amplitude of the alternating voltage is greater than a threshold.

7. The method according to claim 4, wherein the capacitive load is a capacitor.

8. The method according to claim 4, further comprising:
detecting oscillations which appear in the network at the rhythm of the pulsed control signal, and supplying a detection signal representative of the oscillations detected.

9. The method according to claim 8, wherein detecting the oscillations comprises:

supplying a filtered signal, by high-pass or band-pass filtering of the voltage carried by the network with a low cut-off frequency of a few hundred kilohertz;

measuring the noise in the filtered signal;

supplying a noise threshold based on the measured noise; and supplying the detection signal when the amplitude of the filtered signal rises above the noise threshold.

10. A device for transmitting data via a power distribution network, the device comprising:

a coupler for modulating the amplitude of a voltage carried by a power distribution network in order to transmit data, the coupler comprising:

first and second connection terminals to wires of the power distribution network;

at least one capacitive load and a circuit for modulating the amplitude of a network voltage in series, connected between the first and second terminals, the amplitude modulation circuit including at least one Zener diode and at least one switch;

a control input configured to apply, to the switch, a control signal controlling the closing and opening of the switch to short-circuit the Zener diode and modulate the amplitude of the network voltage;

a driver circuit configured to apply to the coupler, a data carrying pulsed control signal comprising short make pulses, such that the switch of the coupler is conductive during the duration of each make pulse and short-circuits the Zener diode, the driver circuit being configured so that the duration of each make pulse is less than 130 nanoseconds and less than a time constant of the capacitive load to cause an oscillatory response of the network at a resonance frequency thereof in the form of a high frequency oscillation of the network voltage.

11. The device according to claim 10, wherein the Zener diode has a first terminal connected to a second terminal of the capacitive load, and a second terminal connected to the second connection terminal of the coupler, a first terminal of the capacitive load being connected to the first connection terminal of the coupler.

12. The device according to claim 10, further comprising:

a first Zener diode having a first terminal connected to a second terminal of the capacitive load, and a first terminal of the capacitive load being connected to the first connection terminal of the coupler;

a second Zener diode having a first terminal connected to a second connection terminal of the coupler and a second terminal connected to a second terminal of the first Zener diode; and at least one first switch in parallel with the first Zener diode and a second switch in parallel with the second Zener diode, the control input being configured to apply, to each switch, the control signal.

13. The device for transmitting data according to claim 10, further comprising:

a processing circuit to receive a data signal to transmit and supply the pulsed control signal as an image of the data to be transmitted according to a determined encryption.

14. The device for transmitting data according to claim 10, further comprising a detection circuit configured to detect oscillations in the network, and supply a data carrying detection signal representative of the oscillations detected.

15. The device for transmitting data according to claim 14, wherein the detection circuit further comprises:

a low-pass or band-pass filter receiving the voltage carried by the network, having a cut-off frequency on the order of a hundred kilohertz and supplying a filtered signal;

a circuit for detecting noise in the filtered signal and supplying a noise threshold; and a circuit which compares the filtered signal and the noise threshold, supplying the detection signal when the amplitude of the filtered signal rises above the noise threshold.

16. The device for transmitting data according to claim 14, further comprising a processing circuit configured to decode the detection signal and supply a data signal.

17. The device for transmitting data according to claim 14, further comprising a repeater configured to regenerate, in the network, oscillations detected by the detection circuit.

18. The device for transmitting data according to claim 14, wherein the driver circuit is configured to receive the detection signal and to cause the regeneration by the coupler of the oscillations detected by the detection circuit.

19. The device for transmitting data according to claim 10, further comprising:
a synchronization circuit configured to monitor the voltage carried by the network and supply a synchronization signal for generating oscillations.

20. An integrated circuit on semi-conductor chip, comprising a device for transmitting data according to claim 10, the capacitive load of the coupler being external to the chip and connected to terminals thereof.

* * * * *